(12) United States Patent
Itou

(10) Patent No.: US 9,383,799 B2
(45) Date of Patent: Jul. 5, 2016

(54) COMMUNICATION NODE

(71) Applicant: DENSO CORPORATION, Kariya, Aichi-pref. (JP)

(72) Inventor: Akito Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 14/107,111

(22) Filed: Dec. 16, 2013

(65) Prior Publication Data

US 2014/0245046 A1   Aug. 28, 2014

(30) Foreign Application Priority Data

Feb. 27, 2013   (JP) .................................. 2013-37465

(51) Int. Cl.
*G06F 1/32* (2006.01)
*H04L 12/40* (2006.01)

(52) U.S. Cl.
CPC ........ *G06F 1/3209* (2013.01); *H04L 12/40039* (2013.01); *H04L 12/40052* (2013.01); *H04L 2012/40215* (2013.01); *H04L 2012/40234* (2013.01)

(58) Field of Classification Search
CPC ............... H04L 12/40039; H04L 2012/40215; H04L 2012/40234; H04L 12/40052
See application file for complete search history.

(56) References Cited

U.S. PATENT DOCUMENTS

| | | | | |
|---|---|---|---|---|
| 6,954,704 B2 * | 10/2005 | Minami et al. | ................... | 702/62 |
| 7,594,226 B2 * | 9/2009 | Stelzer et al. | ................. | 717/178 |
| 8,767,753 B2 * | 7/2014 | Van de Maele | ............... | 370/401 |
| 9,112,721 B2 * | 8/2015 | Behrens et al. | | |
| 2012/0051241 A1 | 3/2012 | Mori et al. | | |
| 2012/0257655 A1 | 10/2012 | Muth | | |
| 2012/0271975 A1 | 10/2012 | Elend | | |

FOREIGN PATENT DOCUMENTS

| | | |
|---|---|---|
| JP | 2012-49886 A | 3/2012 |
| JP | 2012-054703 A | 3/2012 |

OTHER PUBLICATIONS

Office Action mailed Jan. 13, 2015 issued in corresponding JP patent application No. 2013-037465 (and English translation).

* cited by examiner

*Primary Examiner* — Ayaz Sheikh
*Assistant Examiner* — Debebe Asefa
(74) *Attorney, Agent, or Firm* — Posz Law Group, PLC

(57) ABSTRACT

When an ECU serving as a communication node is under sleep mode, a switch portion in a transceiver connects a data transmit port of a microcomputer to a memory controller. The microcomputer sends, to the memory controller, a code write-in request for writing a code while outputting a write data that is written as the code. The data transmit port, which is to output a communication data, is commonly used in order to output the write-in request and the write data; this suppresses the increase in the number of connection lines between the microcomputer and the transceiver and the increase in the number of ports of the microcomputer.

9 Claims, 6 Drawing Sheets

FIG. 3

| STB PORT | TX CONNECT TO |
|---|---|
| STB SIGNAL | MEMORY CONTROLLER |
| ACTIVATE SIGNAL | TRANSMITTER |

FIG. 4

| STB PORT | BUS | CONTROLLER | OSCILLATE |
|---|---|---|---|
| STB SIGNAL FOR PERIOD | RECESSIVE FOR PERIOD | NO OUTPUT FOR PERIOD | OFF |
| OTHER THAN ABOVE | OTHER THAN ABOVE | OTHER THAN ABOVE | ON |

COMMUNICATION NODE

CROSS REFERENCE TO RELATED APPLICATION

The present application is based on Japanese Patent Application No. 2013-37465 filed on Feb. 27, 2013, the disclosure of which is incorporated herein by reference.

TECHNICAL FIELD

The present disclosure relates to a communication node connected to a communication system to permit a plurality of communication nodes to connect mutually via a communication bus.

BACKGROUND ART

[Patent Literature 1] JP 2012-54830 A (US 2012/0051241 A)

For example, Patent Literature 1 discloses a communication system to wake up individually communication nodes that are under sleep mode. The communication system uses a communication frame that contains an activation pattern area and an assignment pattern area. A subject communication node, which is any one of the plurality of communication nodes, includes a transceiver with an activation frame detection section. When determining a received communication frame as an activation frame directed at the subject communication node itself, the activation frame detection section generates a wake-up signal, thereby permitting a microcomputer of the subject communication node to execute a wake-up process. The received communication frame is determined as an activation frame directed at the subject communication node itself under condition that (i) the activation pattern area contains an activation-used ID having an area length up to a border point, the area length being longer than an activation length, and, simultaneously, (ii) the assignment pattern area contains an assignment code assigned to the subject communication node.

The communication system in Patent Literature 1 requires a subject communication node to previously store an assignment code that is assigned to the subject communication node itself in a memory (assignment pattern configuration circuit) inside of an own transceiver. However, Patent Literature 1 does not specifically describe how to store the assignment code.

For instance, a communication node includes a control portion (i.e., microcomputer) and a transceiver. The control portion generates data that is to be transmitted and processes data that is received. The transceiver transmits the data generated by the control portion to the communication bus as a communication frame, and receives data that is sent out as a communication frame from a different communication node.

The present Inventor supposes a case that the control portion may be used to write an assignment code in a memory inside of the transceiver. If this case uses a direct access from the control portion to the memory for write-in process, additional configuration may be necessary. That is, an interface may be necessary in the transceiver for receiving a signal transmitted from the control portion to the memory, such as a notice signal of writing request of a code or a code data indicating the code; a dedicated signal line may be necessary for connecting between the interface and the control portion. This may increase the number of signal lines or the number of ports of the control portion, leading to the increase the body magnitude of the communication node as well as the increase of costs.

SUMMARY

It is an object of the present disclosure to provide a communication node to permit a control portion to write an assignment code on a memory in a transceiver while suppressing the number of signal lines or the number of ports of the control portion.

To achieve the above object, according to an example of the present disclosure, a communication node is provided to be one of a plurality of communication nodes in a communication system where the communication node communicates via a communication bus with a different communication node that is any one of the plurality of communication nodes excluding the communication node itself. The communication node has an operation mode including (i) a sleep mode that stops communication via the communication bus to save electricity consumption and (ii) a usual mode that enables communication via the communication bus. The communication node includes a control portion and a transceiver. The control portion generates a transmit data that is a data to be transmitted. The transceiver includes a transmitter and a receiver. The transmitter transmits the transmit data generated by the control portion to the communication bus as a transmit communication frame. The receiver receives a receive data that is a data received as a receive communication frame that is sent out to the communication bus from the different communication node, the receiver outputting the receive data to the control portion, the control portion processing the receive data. The transceiver further includes a memory, an activation portion, a write-in portion, and a switch portion. The memory stores a store code to identify whether the receive communication frame is directed to the communication node itself. The activation portion determines, when the control portion is under the sleep mode, whether the receive communication frame is an activation frame to activate the communication node itself based on whether the store code in the memory corresponds to a receive code that is a code included in the receive communication frame received by the receiver. The activation portion further permits the control portion to transition from the sleep mode into the usual mode when determining that the receive communication frame is the activation frame to activate the communication node itself. The write-in portion writes a write code in the memory as the store code. The switch portion connects a transmission route to the write-in portion when the control portion is under the sleep mode, the transmission route by which the control portion outputs the transmit data to the transmitter. Herein, the control portion provides the write-in portion with a write data that corresponds to the write code via the transmission route; and the write-in portion then writes the write code in the memory as the store code based on the write data.

Under the above configuration, when the control portion is under the sleep mode, the transmission route, which is used for the control portion to output data to the transmitter, is connected to the write-in portion. Therefore, the transmission route can be also used as a route for the control portion to provide write data. This configuration helps prevent the increase in the number of connection lines between the control portion and the transceiver or the number of ports of the control portion.

According to an optional example of the above communication node, a read-out portion may be further included to read out the store code stored in the memory as a read code, and then transmit the read code to the control portion via a receive route, the receive route by which the receiver outputs the receive data to the control portion.

Thus, the read-out portion may be provided which reads out a code stored in a memory and outputs the read code to the control portion. This enables the control portion to determine whether a correct code is written in or not. Further, when the code read from the memory is outputted to the control portion, a route from the receiver to the control portion is used. This further helps prevent the increase in the number of signal lines or the number of ports of the control portion.

According to an optional example of the above communication node, when it is detected that the store code stored in the memory is anomalous, the activation portion may configure the transceiver to output, to the control portion, any communication frame sent out over the communication bus.

This configuration avoids an occurrence of a situation where an anomaly in a code stored in the memory interferes with the return from the sleep mode to thereby disable the reception of any communication frame.

BRIEF DESCRIPTION OF THE DRAWINGS

The above and other objects, features, and advantages of the present disclosure will become more apparent from the following detailed description made with reference to the accompanying drawings. In the drawings:

FIG. 3 is a diagram for explaining a relation between signals from a standby port of a microcomputer and connection destinations of a data transmit port;

FIG. 4 is a diagram illustrating an activation condition and a stop condition of an oscillating circuit;

DETAILED DESCRIPTION (Embodiment)

Figure 1:
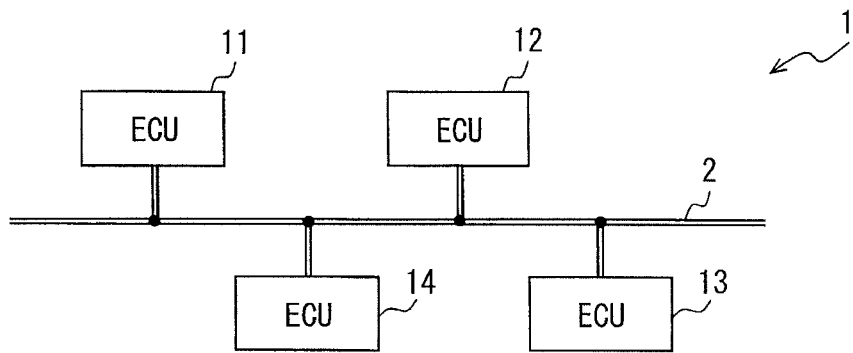
FIG. 1 is a diagram illustrating an overall configuration of a communication system including ECUs serving as communication nodes according to an embodiment of the present disclosure.

The following describes an embodiment of the present disclosure with reference to drawings. FIG. 1 illustrates an overall configuration of a communication system including ECUs (Electronic Control Units) serving as communication nodes according to an embodiment of the present disclosure. For instance, the embodiment will explain an example where a communication system applies to an in-vehicle LAN (Local Area Network) built in a vehicle such as an automobile. Here, the vehicle to which the communication system is mounted may be also referred to as a host vehicle or a subject vehicle. However, the communication system according to the present disclosure is not necessarily limited to the use in a vehicle; further, it may be also used in another use such as in a building or factory.

With reference to FIG. 1, electronic control units (ECUs) 11 to 14 that serve as communication nodes are connected via a communication bus 2, thereby configuring a communication system 1. The ECUs 11 to 14 control various kinds of in-vehicle instruments mounted in the vehicle. For instance, the in-vehicle instruments include a fuel injector of an engine; an igniter; a compressor, a fan, an air mixing door of an air-conditioner; a braking instrument; or a door lock mechanism. The ECUs 11 to 14 communicate with each other, for example, according to communication protocols, such as CAN (Controller Area Network) or LIN (Local Interconnect Network), to thereby exchange necessary data or perform controls in cooperation (i.e., cooperative control). It is noted that the respective ECUs 11 to 14 are required recently to execute the various kinds of controls even when a host vehicle is under a stop state (i.e., a vehicle stop state). For example, the controls under the vehicle stop state include a smart door lock release (i.e., smart door unlock) or a pre-air conditioning.

For instance, the smart door lock release is executed as follows. First, under the vehicle stop state, a verification ECU performs a wake-up operation periodically to transmit radio waves outwardly around the host vehicle for communicating with a portable terminal that is held by a user of the host vehicle. When a response signal to the radio waves is received from the portable terminal and the ID code in the response signal is verified satisfactorily, a power ECU provides power supply to the door lock release switch provided in a vehicle door to move the switch into an activated state. When the user's manipulation to the door lock release switch in the activated state is detected, a door ECU drives a door lock motor to release the door lock. As explained above, the smart door lock release enables the verification ECU, the power ECU, and the door ECU to exchange data while cooperatively performing controls for the door lock release under the vehicle stop state.

In addition, the pre-air conditioning operates in cases that the portable terminal held by the user issues an execution instruction of the pre-air conditioning when the verification by the verification ECU is satisfied. When detecting the issuance of the execution instruction for the pre-air conditioning, the verification ECU instructs an air-conditioning ECU and the power ECU to execute the pre-air conditioning. Then, the power ECU provides the power to control target elements of the air-conditioner apparatus, such as a compressor, a fan, and an air mixing door. Furthermore, the air-conditioner ECU controls the drive states of the compressor, the fan, and the air mixing door, to adjust the temperature of the vehicle compartment to the preset temperature or the temperature specified at the issuance of the execution instruction. This enables the vehicle compartment to be adjusted at a comfortable temperature when the user gets in. Thus, the pre-air conditioning also requires the verification ECU, the power ECU, and the air-conditioner ECU to perform controls in cooperation under the vehicle stop state.

The vehicle stop state signifies that the power generation is not performed by an alternator or the regeneration brake is not performed by the motor. This situation significantly requires the power consumption by the respective ECUs 11 to 14 to decrease to a minimum level. Therefore, for example, the CAN protocol permits the ECUs 11 to 14 to be in the sleep mode. That is, the CAN protocol enables the respective ECUs 11 to 14 to move to the sleep mode to stop a communication function or microcomputer's arithmetic processing function for power saving under the condition where the communication bus 2 moves to the recessive level and then remains in an idle state (i.e., not crowded state) for a predetermined time period. Furthermore, a subject ECU among the ECUs 11 to 14 is enabled to designate a specific ECU among the ECUs 11 to 14 excluding the subject ECU and instruct the specific ECU to move to the sleep mode.

It is noted that the CAN protocol uses a 2-wire communication line serving as the communication bus 2, in which the two wires are connected with the termination resistors at both ends. A subject ECU, which transmits data, controls a transceiver to generate two kinds of high and low potential differences (voltage differences) between the 2-wire communication line to thereby communicate "1" and "0" over the communication bus 2. In this case, the CAN protocol defines the logic "0" as a dominant level generating the high voltage difference in the 2-wire communication line.

It is noted that under a usual CAN protocol, when detecting that the communication bus becomes in the dominant level, any ECU, which has been under the sleep mode, inevitably returns (i.e., transitions) from the sleep mode to a usual mode that is an operation mode enabling a communication function. However, some control often requires only specific ECU(s) to participate in communication, and thus does not require all the ECUs to be activated. Therefore, when all the ECUs are activated by detecting the dominant (dominant level), even an ECU which does not necessarily need to participate in communication may also be activated; this results in consuming electric power uselessly. As indicated in "BACKGROUND ART", a technology is proposed which can activate each ECU (communication node) individually, but such technology does not consider how to store the code indicating the own node in memory of each ECU.

To that end, the present embodiment enables a simple configuration to store a code in memory of each ECU. The following describes a featured configuration of the present embodiment.

Figure 2:
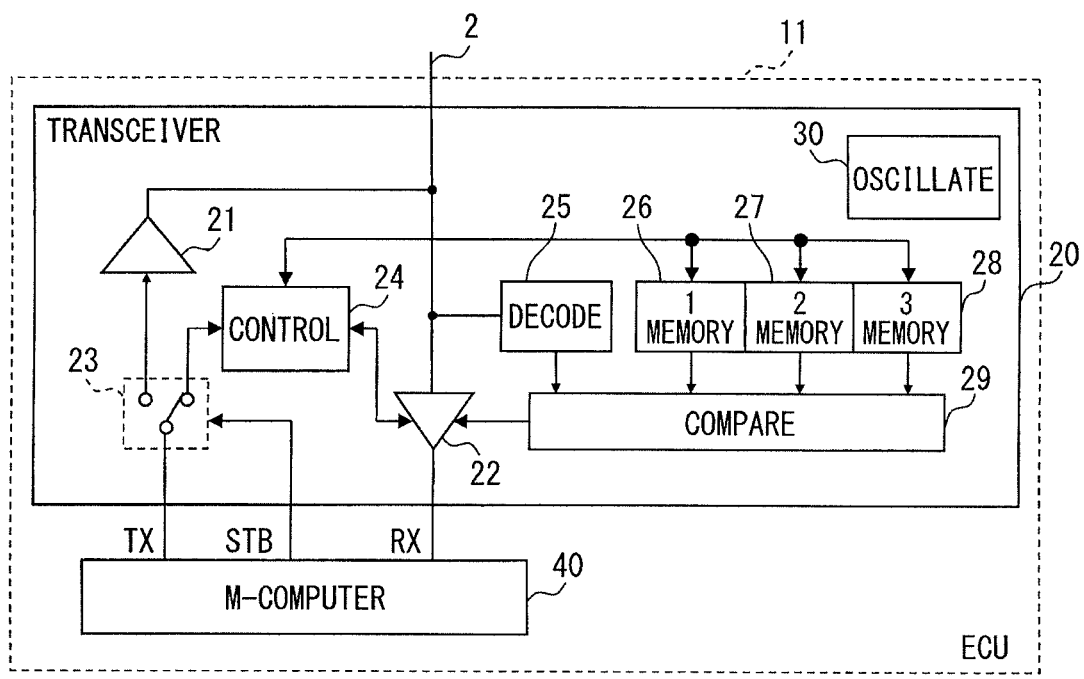
FIG. 2 is a diagram illustrating a configuration of each ECU.

FIG. 2 illustrates a configuration of each ECU 11 to 14 serving as a communication node. Each ECU 11 to 14 has a common main configuration; thus, the following explains the ECU 11 as a representative example.

With reference to FIG. 2, the ECU 11 includes a microcomputer 40 serving as a control portion that (i) generates data (transmit data) that is to be transmitted to another ECU 12 to 14 via the communication bus 2 and (ii) processes data (receive data) that is received from another ECU 12 to 14.

The microcomputer 40 includes a data transmit port TX from which a data (i.e., transmit data) is outputted to another ECU 12 to 14. Such transmit data from the ECU 11 includes the data necessary for performing cooperative control with a different ECU 12 to 14, and an individual activation signal that permits the different ECU 12 to 14 to transition to the usual mode from the sleep mode, if the different ECU 12 to 14 is under the sleep mode. For example, suppose the case of the smart door lock release mentioned above. In this case, when the verification ECU verifies satisfactorily the ID code (i.e., fulfills the verification of the ID code), the verification ECU outputs an individual activation signal so as to permit each of the power ECU and the door ECU to transition (i.e., move) to the usual mode. Furthermore, the microcomputer 40 outputs code data from the data transmit port TX; the code data is used by a first memory 26, a second memory 27, and a third memory 28 to store a code.

The microcomputer 40 of the ECU 11 includes a data receive port RX through which the microcomputer 40 receives a data (receive data) from another ECU 12 to 14. Furthermore, when the compare logic portion 29 determines that an individual activation signal from another ECU is received, the compare logic portion 29 outputs a dominant signal to the receiver 22; the data receive port RX receives the dominant signal via the receiver 22.

Furthermore, the microcomputer 40 includes a standby port STB. The microcomputer 40 outputs a standby signal from the standby port STB when the ECU 11 is under the sleep mode and when the ECU 11 performs an initial process at the time of turning on of the ignition switch of the vehicle, for instance. The initial process of the ECU 11 may be also performed on a basis of another signal instead of that of the ignition switch. In contrast, the microcomputer 40 outputs an activation signal from the standby port while the ECU 11 operates in the usual mode.

Although unshown, an external activation signal input port may be provided in the microcomputer 40; the external activation signal input port is used to receive an external activation signal from an external source such as a timer or a switch. When an external activation signal is inputted into the external activation signal input port, the microcomputer 40 is activated and outputs an activation signal from the standby port STB.

The ECU 11 includes a transceiver 20 for communicating with another ECU 12 to 14 via the communication bus 2. The transceiver 20 includes a transmitter 21. The transmitter 21 is connected to the data transmit port TX of the microcomputer 40 via a switch portion 23 to generate the high and low potential differences in the 2-wire communication line of the communication bus 2 depending on the logical level of the data outputted by the microcomputer 40. This permits transmission of a communication frame to the communication bus 2; the communication frame includes either the signal of "1" or the signal of "0" according to the logical level of the data to be transmitted.

The switch portion 23 switches the connection destination of the data transmit port Tx between to the transmitter 21 and to the memory controller 24 depending on the signals outputted from the standby port STB of the microcomputer 40. To be specific, with reference to FIG. 3, the switch portion 23 switches the connection destination of the data transmit port TX to the transmitter 21 when an activation signal is outputted from the standby port STB. Therefore, at the time of outputting an activation signal, the ECU 11 can transmit a communication frame from the transmitter 21; the communication frame is according to a data (transmit data) which the microcomputer 40 outputs.

In contrast, the switch portion 23 switches the connection destination of the data transmit port TX to the memory controller 24 when a standby signal is outputted from the standby port STB. As explained above, the microcomputer 40 outputs a standby signal from the standby port STB when the ECU 11 is under the sleep mode and when the ECU 11 performs an initial process at the time of turning on of the ignition switch of the vehicle.

When a standby signal is outputted at the time of an initial process and the connection destination of the data transmit port TX is thereby switched to the memory controller 24, the microcomputer 40 may output a write-in request and a code data. In such case, the memory controller 24 starts and executes a code write-in process (which may be also referred to as a write-in process) to the first memory 26, the second memory 27, and the third memory 28. As a result, each time an initial process of the ECU 11 is executed, the codes stored in the first memory 26, the second memory 27, and the third memory 28 are re-written; this can refresh the stored codes.

Upon receiving the write-in request and the code data as well from the microcomputer 40, the memory controller 24 executes a write-in process which writes the code data in the first memory 26, the second memory 27, and the third memory 28 in this order. The write-in process writes an identical code in each of the first memory 26, the second memory 27, and the third memory 28. Thus, the identical code is stored in the respective three memories. For example, even when the stored codes are partially corrupted in bits, the correct code can be identified to enable an individual activation signal to be distinguished. However, the number of memories may be two or even one. It is noted that all the first memory 26, the second memory 27, and the third memory 28 may be referred to as a memory collectively; further, in this case, each of the first memory 26, the second memory 27, and the third memory 28 may be referred to as a memory portion.

After the end of the write-in process, a code read-out request (also referred to as a read-out request) arises from the microcomputer 40 to thereby permit the memory controller 24 to read out the respective codes in order from the first memory 26 through the second memory 27 to the third memory 28. The memory controller 24 outputs the read codes to the data receive port RX of the microcomputer 40 via the receiver 22. The microcomputer 40 compares the code data received from the receiver 22 with the code data outputted from the data transmit port TX to thereby confirm whether the correct code is written in the first memory 26, the second memory, and the third memory 28.

The receiver 22 is to convert the potential difference in the communication bus 2 into the logical level in the microcomputer 40, and outputs it to the data receive port Rx of the microcomputer 40. In addition, the receiver 22 also has a function to relay outputs of the memory controller 24 or the compare logic portion 29 to the data receive port RX of the microcomputer 40, as mentioned above. Furthermore, the receiver 22 also has a function to stop an output according to the potential difference in the communication bus 2 when a standby signal is outputted from the standby port STB of the microcomputer 40.

Like the receiver 22, the decoder 25 has a function to decode the potential difference on the communication bus 2 to the logical level, and output it to the compare logic portion 29. The compare logic portion 29 determines whether combinations of the logical levels decoded by the decoder 25 correspond to codes stored in the first memory 26, the second memory 27, and the third memory 28. When determining that they correspond, the compare logic portion 29 outputs a dominant signal to the microcomputer 40 via the receiver 22, as mentioned above. When the dominant signal is inputted into the data receive port RX of the microcomputer 40 under the sleep mode of the ECU 11, the microcomputer 40 is activated and outputs an activation signal from the standby port STB. This moves the ECU 11 from the sleep mode to the usual mode. That is, the output of the activation signal permits the data transmit port TX of the microcomputer 40 to connect to the transmitter 21 while also permitting the receiver 22 to output a signal of a logical level according to a potential difference in the communication bus 2. Thereby, the microcomputer 40 comes to be able to transmit and receive various kinds of data via the communication bus 2.

An oscillating circuit 30 generates a clock pulse signal used as a reference of an operation timing of each part of the transceiver 20. In order to reduce the power consumption in the transceiver 20, the oscillating circuit 30 comes to be in a stop state (i.e., into OFF state from ON state) when the following respective conditions are satisfied. That is, with reference to FIG. 4, (i) an output of a standby signal from the standby port STB continues greater than a predetermined time period; (ii) a recessive level in the communication bus 2 continues greater than a predetermined time period; and (iii) no output of signals from the memory controller 24 continues greater than a predetermined time period.

The following explains processes to enable the first memory 26, the second memory 27, and the third memory 28 to store a code correctly with reference to flowcharts of FIGS. 5 to 8.

Figure 5:
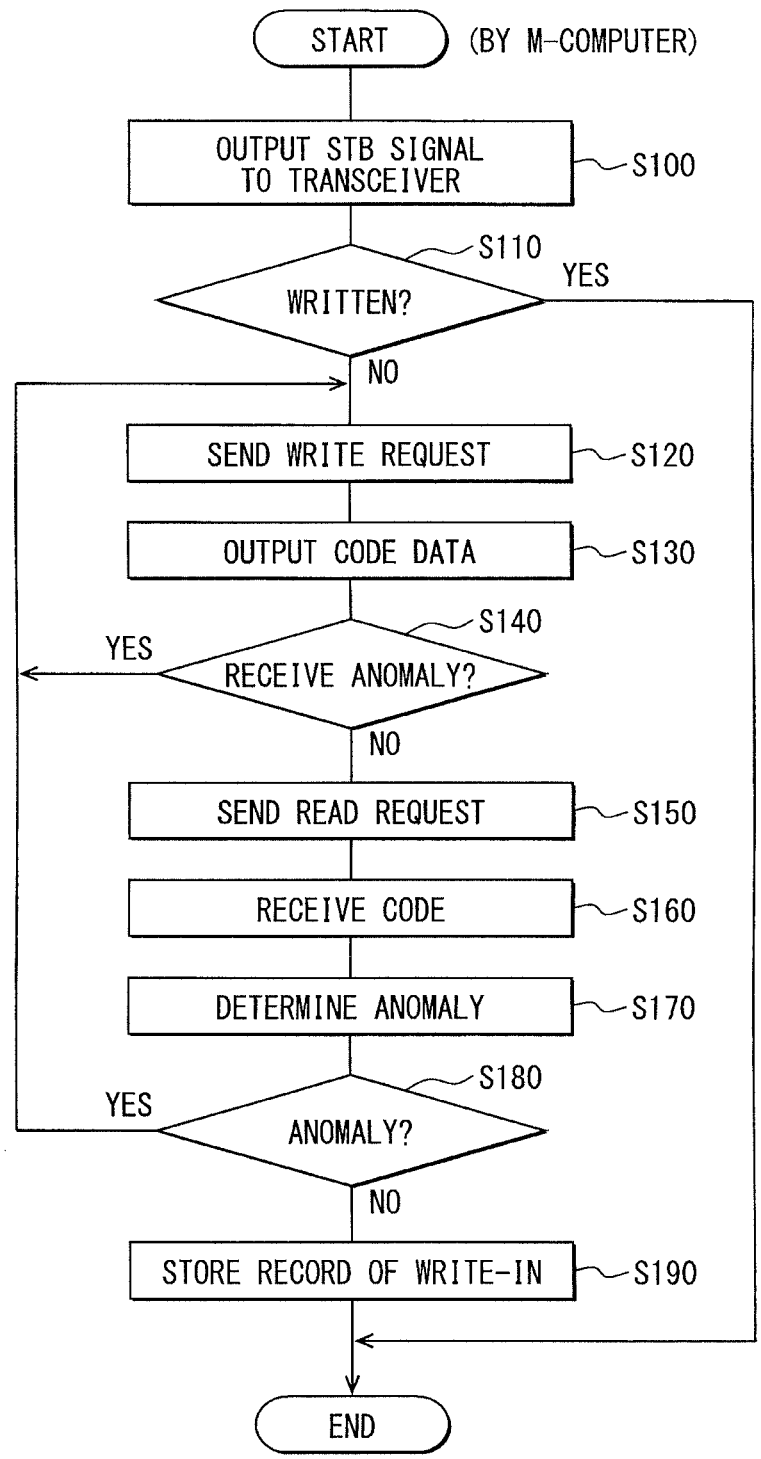
FIG. 5 is a flowchart diagram illustrating a process by a microcomputer.

FIG. 5 is a flowchart which indicates an initial process of the ECU 11 and a process when the ECU 11 moves to a sleep mode; the processes are executed by the microcomputer 40. It is further noted that a flowchart in the present application includes sections (also referred to as steps), which are represented, for instance, as S100. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

First, at S100, the microcomputer 40 outputs a standby signal from the standby port STB. At S110, it is determined whether codes are already written in the first memory 26, the second memory 27, and the third memory 28 (whether a code write-in is completed). When it is determined that the code write-in is completed, the process indicated in the flowchart of FIG. 5 is ended. Therefore, when the ECU 11 moves to the sleep mode after the code is written, only a process is executed which outputs a standby signal to the transceiver 20.

In contrast, when it is determined at S110 that the code write-in is not completed, namely, when it is determined that the present process is an initial process and it is determined that a code write-in is necessary. In this case, the processing proceeds to S120. The determination at S110 is made by determining whether a record is stored at S190 which indicates that the code write-in is completed. The initial process of the ECU 11 clears or erases the record initially; thus, it is determined that the code write-in is not completed in the initial process.

At S120, the microprocessor 40 transmits a code write-in request from the data transmit port TX. Since the standby signal is outputted at S100, the connection destination of the data transmit port TX is switched to the memory controller 24 by the switch portion 23. Therefore, the code write-in request is received by the memory controller 24. At S130, the microcomputer 40 outputs code data (write data) from the data transmit port TX; the code data corresponds to the code written in the first memory 26, the second memory 27, and the third memory 28. Thus, the memory controller 24 acquires the write data that is to be written in the first memory 26, the second memory 27, and the third memory 28.

At S140, it is determined whether a code anomaly notice is received from the memory controller 24. The memory controller 24 determines whether the acquired write data has an anomaly (e.g., protocol anomaly) using a check SUM etc., and sends a code anomaly notice to the microcomputer 40 when it is determined that the write data has an anomaly. When it is determined that a code anomaly notice is received, the processing returns to S120. The microcomputer 40 again outputs a code write-in request and a code data. When it is determined at S140 that a code anomaly notice is not received, the processing proceeds to S150.

At S150, the microcomputer 40 transmits a code read-out request to the memory controller 24. According to the code read-out request, the memory controller 24 reads out the stored codes in the order from the first memory 26 through the second memory 27 to the third memory 28, and outputs the read codes to the data receive port RX via the receiver 22. Therefore, at S160, the data receive port RX receives the code data outputted from the memory controller 24 via the receiver 22.

At S170, it is determined whether or not the code data received at S160 corresponds to or equal to the code data outputted at S130, thereby determining whether the codes stored in the first memory 26, the second memory 27, and the third memory 28 are anomalous. At S180, it is distinguished whether the determination at S170 indicates anomalous or normal. When the determination result indicates anomalous, the processing re-starts from S120 again. This redoes a write-in process of the code from the beginning to control the microcomputer 40 to output a code write-in request and code data again. This enables the first memory 26, the second memory 27, and the third memory 28 to store or record the correct code by replacing the incorrect one. In contrast, when the determination result indicates normal, the processing proceeds to S190, where a record indicating that the code write-in is completed is stored.

Figure 6:
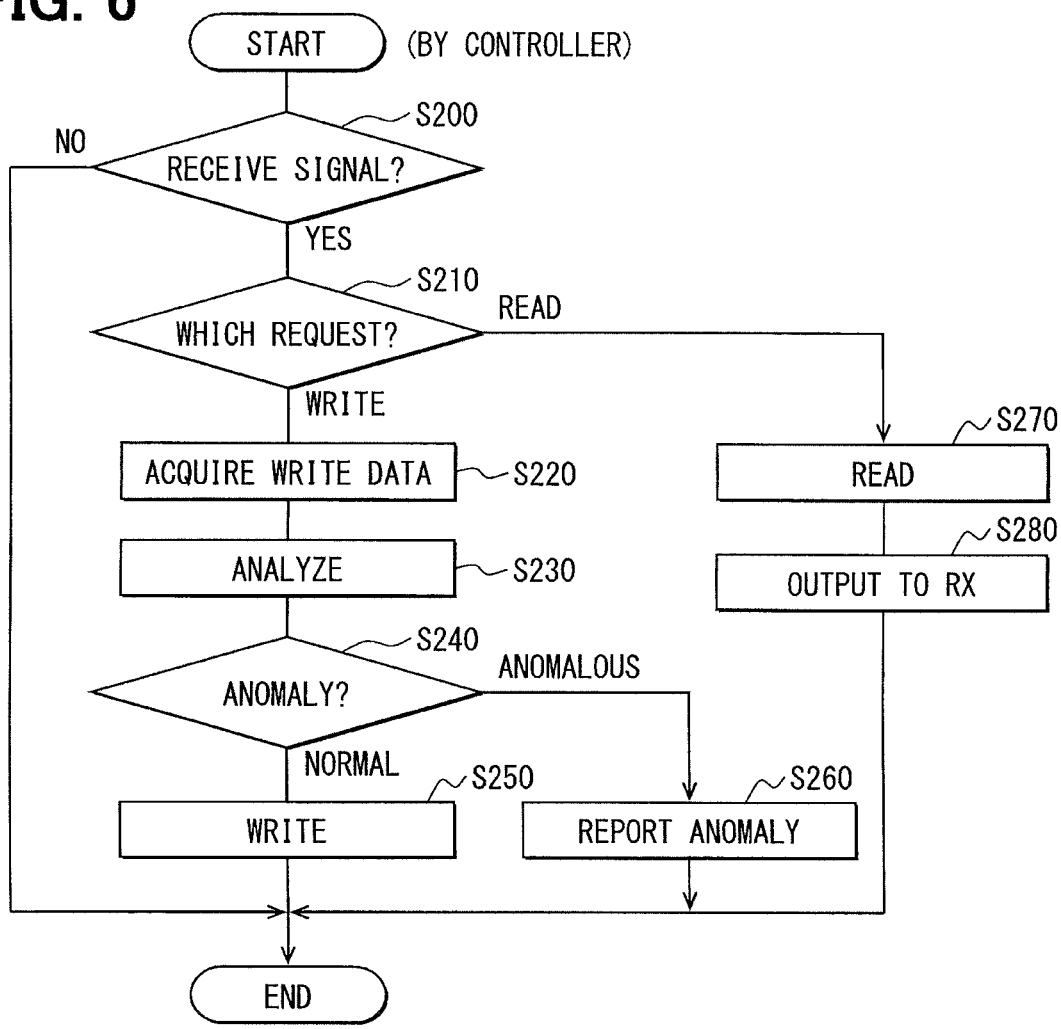
FIG. 6 is a flowchart diagram illustrating a process by a memory controller.

The following explains a process indicated in the flowchart of FIG. 6. The flowchart of FIG. 6 indicates a process executed by the memory controller 24, which may function as a write-in portion or a read-out portion to be explained below.

First, at S200, the memory controller 24 determines whether a signal is received from the microcomputer 40. When it is determined that a signal is not received from the microcomputer 40, the present process is ended. That is, even after the ECU 11 moves to the sleep mode and the switch portion 23 is connected to the microcomputer 40 based on the standby signal, the microcomputer 40 does not output any signal from the data transmit port TX. Thus, the memory controller 24 does not perform a substantial process. In contrast, when it is determined that a signal is received from the microcomputer 40, the processing proceeds to S210.

At S210, it is determined whether the received signal is a write-in request or a read-out request. When it is a write-in request, the processing proceeds to S220, where the memory controller 24 receives a code data outputted from the microcomputer 40, thereby acquiring the write data to be written in the first memory 26, the second memory 27, and the third memory 28. At S230, the memory controller 24 analyzes the acquired write data and determines whether the acquired write data has any anomaly. When it is determined at S240 that the data is normal, the processing proceeds to S250, where an identical data is written in each of the first memory 26, the second memory 27, and the third memory 28 in the order from the first memory 26 through the second memory 27 to the third memory 28, using the acquired write data. In contrast, when it is determined at S240 that the data is anomalous, the processing proceeds to S260, where the memory controller 24 sends a code anomaly notice to the microcomputer 40.

When it is determined at S210 that the received signal is a read-out request, the processing proceeds to S270. At S270, the memory controller 24 reads out the codes stored in the first memory 26, the second memory 27, and the third memory 28 in this order (i.e., from the first memory 26 to the third memory 28). The memory controller 24 outputs the codes, which are read out in order, to the data receive port RX of the microcomputer 40 via the receiver 22.

Figure 7:
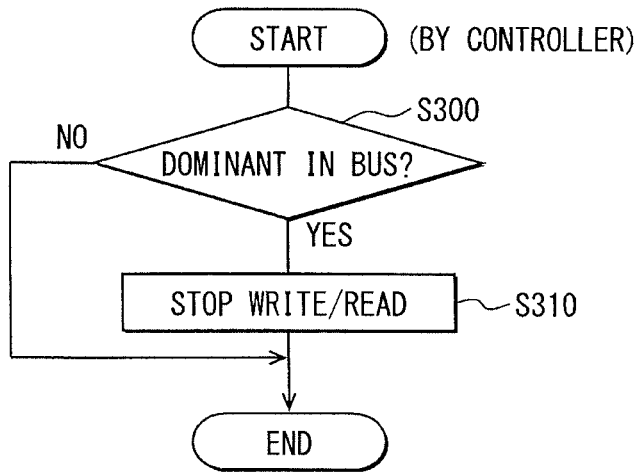
FIG. 7 is a flowchart diagram illustrating an interrupt process by a memory controller.

The following explains a process indicated in the flowchart of FIG. 7. The flowchart of FIG. 7 indicates an interrupt process in the memory controller 24.

The memory controller 24 monitors the level of the communication bus 2. At S300, the memory controller 24 determines whether the level in the communication bus 2 switches from the recessive to the dominant. When it is determined that the level of the communication bus 2 is under dominant, the processing proceeds to S310, where the memory controller 24 stops any one of write-in process or read-out process whichever is being executed (under execution). This interrupt process is to prevent the write-in process or read-out process from interfering with the reception of the data from the communication bus 2.

The initial process for each of the ECUs 11 to 14 is executed almost simultaneously. Therefore, as long as the write-in process and the read-out process are normally performed in each ECU, a subject ECU among the ECUs 11 to 14 does not receive a communication data (communication frame) that contains the dominant from any other ECUs 11 to 14 during the write-in process or the read-out process. However, for instance, the ECU 11 may have a certain anomaly arising in the microcomputer 40, the memory controller 24, or connection routes between the microcomputer 40. In such a case, the memory controller 24 redoes the write-in process or the read-out process. Here, the ECU 11 may receive a communication data during the write-in process or the read-out process, whichever is being redone; the communication data contains the dominant from any one of the other ECUs 12 to 14, which finishes the write-in process and the read-out process normally. This case has a high probability that the correct code is not stored in each of the first memory 26, the second memory 27, and the third memory 28.

Figure 8:
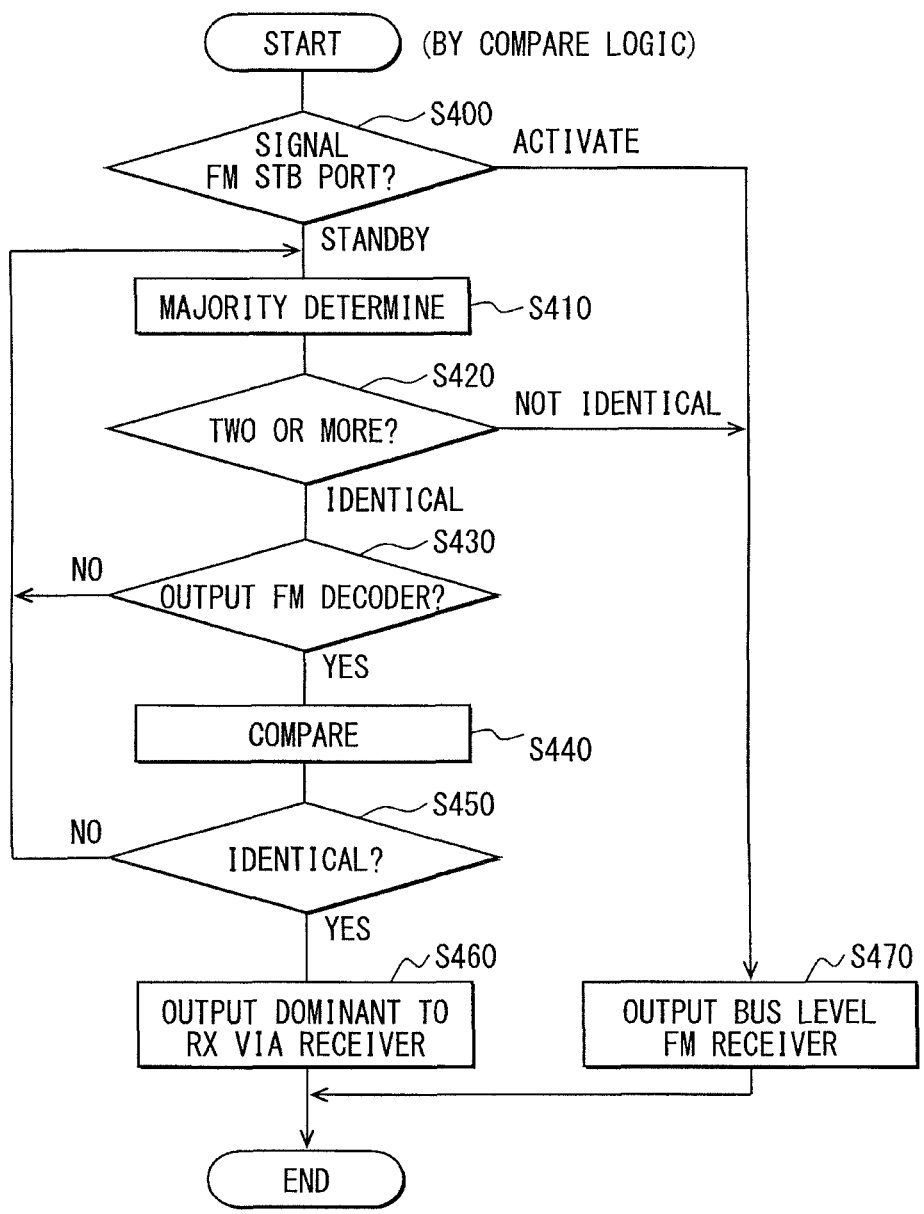
FIG. 8 is a flowchart diagram illustrating a process by a compare logic portion.

The following explains a process indicated in the flowchart of FIG. 8. The flowchart of FIG. 8 indicates a process in the compare logic portion 29. The compare logic portion 29 and the decoder 25 may also function as an activation portion to be explained below.

First, at S400, the compare logic portion 29 determines whether the signal currently outputted from the standby port STB of the microcomputer 40 is a standby signal or an activation signal. When it is determined that the signal is a standby signal, the processing proceeds to S410. In contrast, when it is determined that the signal is an activation signal, the processing proceeds to S470.

At S410, the compare logic portion 29 reads out the codes stored in the first memory 26, the second memory 27, and the third memory 28, thereby performing a majority determination. The majority determination signifies that when two or more codes are identical among three codes, the identical code is supposed to be a correct code. When two or more codes are identical to thereby determine a correct code by the majority determination at S420, the processing proceeds to S430. In contrast, when at least two identical codes are not found, it is determined that a correct code is unknown; thereby, the processing proceeds to S470.

At S430, the compare logic portion 29 determines the presence or absence of an output of the decoder 25 (i.e., the decoder 25 provides an output or not). When the decoder 25 provides an output, the processing proceeds to S440. When the decoder 25 does not provide an output, the processing proceeds to S410. At S440, the output of the decoder 25 is compared with the correct code whether to be identical. At S450, it is determined whether the comparison result indicates that both are identical. When it is determined that the comparison result indicates that both are identical, it is determined that an individual activation signal transmitted from any one of the ECUs 12 to 14 via the communication bus 2 is for the purpose of activating the own node (i.e., ECU 11 itself). The processing proceeds to S460. In contrast, when it is determined that the comparison result does not indicate that both are identical, it is determined that an individual activation signal is not for activating the own node (i.e., ECU 11 itself). The processing returns to S410.

At S460, the compare logic portion 29 outputs a dominant signal to the data receive port RX via the receiver 22. Thereby, the microcomputer 40 is activated and permits the standby port STB to output an activation signal. This moves the operation mode of the ECU 11 from the sleep mode to the usual mode.

In addition, at S470, the receiver 22 is enabled to output a signal according to the level of the communication bus 2. This enables the receiver 22 to receive a data (communication frame), which is transmitted via the communication bus 2, when the ECU 11 is under the usual mode. Furthermore, also when it is determined that the correct code is not stored in the first memory 26, the second memory 27, and the third memory 28, the receiver 22 is enabled to output a signal according to the level of the communication bus 2. Therefore, when the correct code is not stored due to a certain anomaly, all the communication frames are received by the microcomputer 40. This configuration prevents an occurrence of a situation where an anomaly of the stored code disables any reception of a communication frame, which needs to be received.

Further, suppose that the number of memories is two. When the two codes of two respective memories are identical, it can be determined that the correct code is stored in the memory. When the two codes are not identical, it can be determined that the correct code is not stored in the memory. In contrast, when the number of memory portions is one, namely, only one memory portion is provided, whether a stored code is a correct code or not cannot be determined by the comparison process. Whether the stored code is normal or anomalous may be determined using a checksum of code data, a parity bit, or a bit (pattern) that is common in all the code data, for instance, regardless of how many memories are provided.

Figure 9:
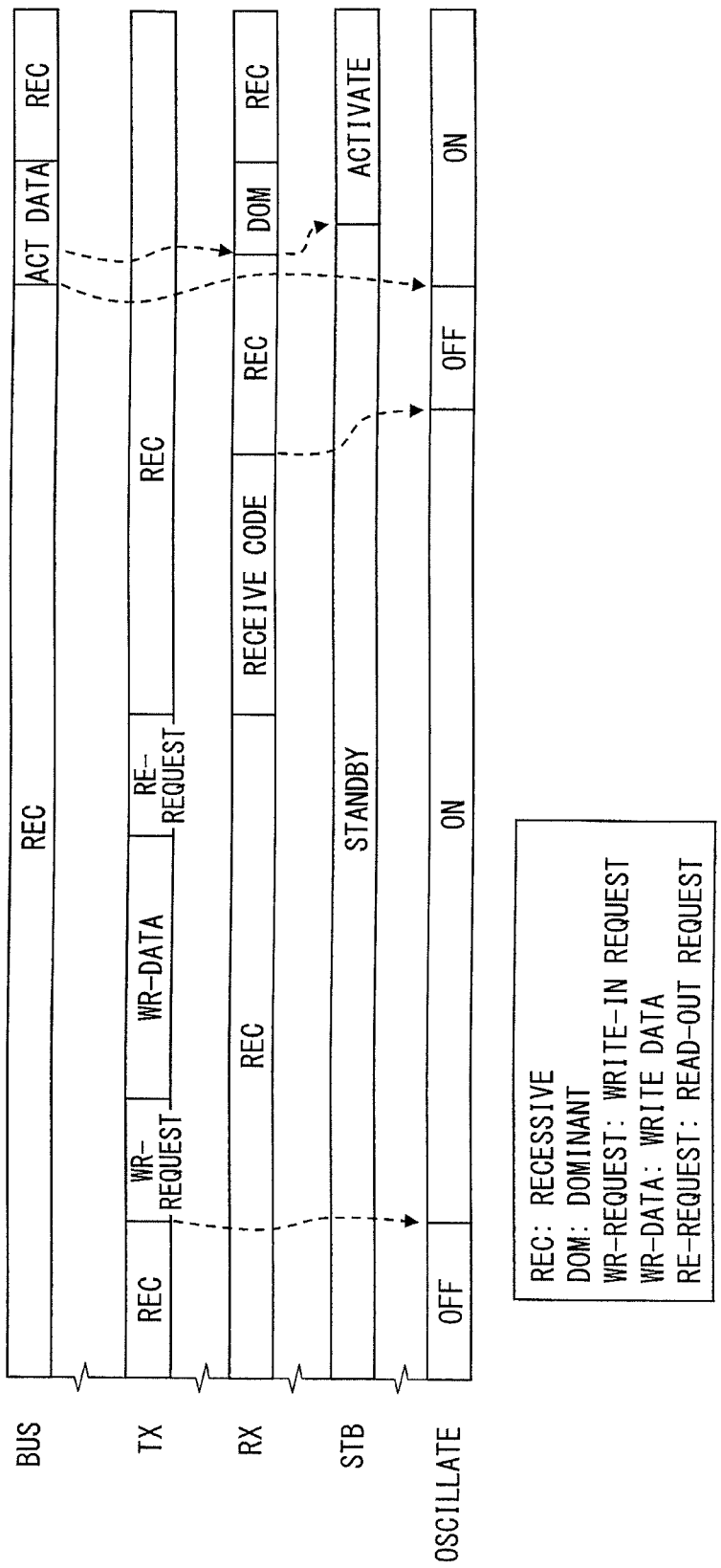
FIG. 9 is a time chart diagram illustrating changes in respective signals in a write-in process and a read-out process.

FIG. 9 is a time chart diagram illustrating examples of changes in respective signals in the write-in process and the read-out process.

When the initial process of the ECU 11 is executed, a standby signal is outputted from the standby port SIB of the microcomputer 40. Then, the data transmit port TX of the microcomputer 40 outputs a write-in request, to thereby permit the oscillating circuit 30 to be activated (i.e., turned into ON state) and output a clock pulse signal.

The microcomputer 40 output a write data (code data) subsequent to the write-in request from the data transmit port TX. Then, the memory controller 24 performs a write-in process using the write data to store the code in the first memory 26, the second memory 27, and the third memory 28.

After this write-in process is completed, the microcomputer 40 outputs a read-out request from the data transmit port TX. According to the read-out request, the memory controller 24 reads out the stored codes in order of the first memory 26, the second memory 27, and the third memory 28, and outputs the read codes to the data receive port RX. At this time, the microcomputer 40 receives the code data via the data receive port RX. When a predetermined time period elapses since the completion of the transmission of the code data by the memory controller 24, the oscillating circuit 30 stops (is turned into OFF state).

Then, an individual activation signal for activating the own node (i.e., ECU 11) is transmitted from one of the other ECUs 12, 13, and 14. This permits the compare logic portion 29 to determine whether the transmitted signal is an individual activation signal for activating the own node based on the code stored in the first memory 26, the second memory 27, and the third memory 28. Then, the compare logic portion 29 outputs a dominant signal to the data receive port RX of the microcomputer 40. Thereby, the microcomputer 40 is activated and permits the standby port STB to output an activation signal; the ECU 11 transitions or moves from the sleep mode to the usual mode.

The embodiment of the present disclosure is thus described; however, without being restricted to the embodiment mentioned above, the present disclosure can be variously modified as long as not deviating from the scope thereof.

For instance, the above embodiment explains an example where a write-in process of the code is performed at the time of an initial process of the ECU 11 for refreshing codes stored in the first memory 26, the second memory 27, and the third memory 28. There is no need to be limited thereto. Unless any anomaly arises in a code written for the first time at the time of powering up an ECU, any repeated write-in process is unnecessary.

Further, the above embodiment explains an example where the switch portion 23 switches the connection destination of the data transmit port Tx between to the transmitter 21 and to the memory controller 24 depending on the signals outputted from the standby port STB of the microcomputer 40. However, it is not necessary to change such a connection destination. For instance, the data transmit port Tx of the microcomputer 40 may be constantly connected to both the transmitter 21 and the memory controller 24. In this case, when a write-in request is outputted from the data transmit port TX of the microcomputer 40 while a standby signal is outputted from the standby port STB, the memory controller 24 may only need to perform a code write-in process using the code data outputted from the data transmit port TX of the microcomputer 40. That is, in this case, the memory controller 24 fulfills a role to substantially connect the data transmit port TX to the memory controller 24 itself when a code data is outputted from the data transmit port TX. Further, in this case, stopping of the power supply to the transmitter 21 according to an output of a standby signal prevents a signal of a code write-in from being sent out to the communication bus 2.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A communication node that is one of a plurality of communication nodes in a communication system where the communication node communicates via a communication bus with a different communication node that is any one of the plurality of communication nodes excluding the communication node itself, the communication node having an operation mode including (i) a sleep mode that stops communication via the communication bus to save electricity consumption and (ii) a usual mode that enables communication via the communication bus, the communication node comprising:

a control portion including a data transmit port (TX) and a data receive port (RX), the control portion that generates a transmit data that is a data to be transmitted via the data transmit port and processes a receive data that is to be received via the data receive port; and a transceiver including
   a transmitter that transmits the transmit data, which is transmitted from the data transmit port of the control portion, to the communication bus as a transmit communication frame,
   a receiver that receives a receive data that is a data received as a receive communication frame that is sent out to the communication bus from the different communication node, the receiver outputting the receive data to the data receive port of the control portion,
   a memory storing a store code to identify whether the receive communication frame is directed to the communication node itself,
   an activation portion that determines, when the control portion is under the sleep mode, whether the receive communication frame is an activation frame to activate the communication node itself based on whether the store code in the memory corresponds to a receive code that is a code included in the receive communication frame received by the receiver, the activation portion further permitting the control portion to transition from the sleep mode into the usual mode when determining that the receive communication frame is the activation frame to activate the communication node itself,
   a write-in portion that writes a write code in the memory as the store code, and
   a switch portion that selectively switches a transmission route from the data transmit port of the control portion between (i) a first transmission route under the usual mode and (ii) a second transmission route under the sleep mode,
wherein
the first transmission route under the usual mode connects the data transmit port to the transmitter of the transceiver, permitting the control portion to transmit data to the transmitter, and
the second transmission route under the sleep mode connects the data transmit port to the write-in portion of the transceiver, permitting the control portion to provide the write-in portion with a write data that corresponds to the write code, and then permitting the write-in portion to write the write code in the memory as the store code based on the write data.

2. The communication node according to claim 1, wherein:
the activation portion determines whether the store code stored in the memory is anomalous; and
when determining that the store code stored in the memory is anomalous, the activation portion configures the transceiver to output, to the control portion, any communication frame sent out over the communication bus.

3. The communication node according to claim 2, wherein:
the memory includes a plurality of memory portions and the write code is written identically in each of the memory portions as the store code; and
when the store codes stored in the respective memory portions are not identical to each other, the activation portion detects that the store code stored in the memory is anomalous.

4. The communication node according to claim 1, further comprising:
a read-out portion that
   reads out the store code stored in the memory as a read code, and
   then transmits the read code to the control portion via a receive route, the receive route by which the receiver outputs the receive data to the control portion.

5. The communication node according to claim 4, wherein when the read code transmitted by the read-out portion is different from the write code that needs to be stored in the memory as the store code, the control portion provides again the write-in portion with the write data to permit the write-in portion to again write the write code in the memory as the store code based on the write data.

6. The communication node according to claim 1, wherein the write-in portion determines whether the write data provided by the control portion is normal or not; and
the write-in portion writes the write code corresponding to the write data in the memory as the store code when determining that the write data is normal.

7. The communication node according to claim 6, wherein:
the write-in portion sends a code anomaly notice to the control portion when determining that the write data is not normal; and
the control portion provides again the write-in portion with the write data according to the code anomaly notice.

8. The communication node according to claim 1, wherein in case that the communication bus switches from recessive level into dominant level when the write-in portion is under a write-in process that is writing the write code in the memory as the store code, the write-in portion stops the write-in process.

9. The communication node according to claim 4, wherein in case that the communication bus switches from recessive level into dominant level when the read-out portion is under a read-out process that is reading out the store code stored in the memory, the read-out portion stops the read-out process.

* * * * *